United States Patent Office 2,950,302
Patented Aug. 23, 1960

2,950,302

PREPARATION OF ORGANOMETALLIC COMPOUNDS

James M. Riddle, Baton Rouge, La.

No Drawing. Filed May 1, 1959, Ser. No. 810,240

11 Claims. (Cl. 260—429.7)

This invention is concerned with the preparation of organometallic compounds, particularly those of lead, mercury and tin.

There are many techniques disclosed in the literature for the preparation of various organometallic compounds, including those of lead, mercury, and tin. For example, typical among the processes for producing organolead, organomercury, or organotin compounds are the reaction of the metals themselves, or alloys thereof, with organic halides, and the reaction of salts thereof, particularly the halides with certain organometallic compounds, especially the Grignard reagent. Of the many diverse methods for preparing these compounds, tetraethyllead is by far the only product produced in appreciable commercial amounts. While the commercial process involving the reaction of a sodium lead alloy with ethyl chloride has been in operation for over 30 years and is quite satisfactory, it is still not without certain disadvantages. For example, inherent in the process is that a maximum of 25 percent of the lead initially reacted is converted to tetraethyllead. Further, the handling of ethyl chloride requires comparatively cautious and close controls. While the process has been considerably improved in many respects through the years, it is still desirable to provide new processes which would overcome the above and other disadvantages of the present commercial process.

More recently, there has been disclosed processes which are of particular advantage over the present commercial process for making organolead compounds involving the reaction of certain lead salts and oxides with particular organometallics. While these new developments have considerably advanced the art of preparation of organometallic compounds, particularly the alkyllead compounds, it is still desirable to find new and improved processes for the production of such compounds which will further simplify the techniques involved, and provide the art with alternate and more economical procedures.

Accordingly, an object of this invention is to provide a new and novel process for the production of organometallic compounds, particularly those of the metals lead, tin, and mercury. Another object is to provide a process for the production of such compounds in high yield and purity. A still further object of this invention is to provide a method for the production of the organotin, lead, and mercury compounds by a more simplified procedure which overcomes the above and other disadvantages of the prior art methods. A specific object is to provide a novel and a more advantageous process for the production of organolead compounds. These and other objects will be evident as the discussion proceeds.

The above and other objects of this invention are accomplished by the reaction of a lead, tin, or mercury compound with a bimetallic organometallic compound, wherein one metal is boron and the other metal is selected from the group consisting of group I-A and II-A metals, in the presence of water. The lead, tin, and mercury compounds can be their oxides or their inorganic or organic salts. The lead halides, oxides, and salts of lower alkanoic acids are particularly preferred, especially lead chloride and monoxide. The bimetallic organometallic compound in which one metal is a group I-A metal, especially sodium, and the other metal is boron, and the valences thereof are satisfied only by alkyl groups having up to and including about 8 carbon atoms, are especially preferred, particularly sodium tetraethylboron. While the process is adaptable to operation at various temperatures, particular advantage is achieved when the reaction is conducted between about 20 to 100° C. The amount of water present in the system is generally sufficient to provide a fluid reaction mixture. Thus, one preferred embodiment of this invention comprises the reaction of lead oxide with sodium tetraethylboron at a temperature between about 20 to 100° C. in the presence of water. In a still further particular embodiment of this invention, the reaction is conducted at a stoichiometry such that a particularly valuable by-product is co-produced, e.g. triethylborane when sodium tetraethylboron is the starting reactant, which is of considerable utility or can be employed in reproducing the starting bimetallic organometallic compound. For example, in the reaction of sodium tetraethylboron with lead oxide at a temperature between about 20 to 100° C. in the presence of water at a stoichiometry such that only one of the alkyl groups in the sodium tetraethylboron is reacted, tetraethyllead is obtained along with triethylborane. Other embodiments will be brought forth hereinafter.

The present invention has many advantages over the prior art techniques for producing organolead, tin, and mercury compounds. For example, these compounds are produced in high yields employing less stringent conditions than required heretofore. Further, as much as 50 percent and higher of the divalent lead and tin reactants and 100 percent of the mercury and tetravalent lead and tin reactants is convertible to the desired organometallic compound. A further advantage is that a completely liquid reaction system wherein all reactants are miscible is possible. Another advantage is that with proper choice of stoichiometry, a by-product boron compound is produced which is readily recoverable and can be reacted to form the starting bimetallic organometallic reactant in the present process, thereby resulting in a conservation of this material and its only consumption being toward the formation of the desired organolead, tin, or mercury compound. Among the further advantages of the process of this invention is that it, for the first time, provides a technique whereby the comparatively cheap organometallics, such as ethylsodium, are used in the unique aqueous system by virtue of being a complex reactant, such as sodium tetraethylboron. This particular advantage also inherently results in a more efficient and simplified method for using compounds such as ethylsodium, which have heretofore been prepared only with difficulty and have been of limited usage previously because of their extreme reactivity to water, air and moisture. An additional advantage of the process is that the primary products, organolead, tin, or mercury compounds, are readily recoverable in most cases being withdrawn by gravity from the reaction system. Alternatively, the primary product can be removed from the system by distillation, or steam distillation, and readily separated from the water. These and other advantages of the process will be evident as the discussion proceeds.

In general, any compound of lead, tin, or mercury which is reactive with the designated bimetallic organometallic compounds is employable in the process of this invention. Such lead, tin, and mercury compounds can generally be classed as salts and oxides. The salts include those of both inorganic and organic acids. While organic acids generally are considered as having a carboxylic acid grouping, it is to be understood that organic compounds not having such groupings, but having strongly acidic hydrogen which form salts with lead, mercury, or tin, are equally applicable as, for example, the alcohols and phenols. Among further criteria of the lead, mercury, and tin reactants are that they be essentially inert to water or, at most, only form hydrated systems. Thus, among the lead, mercury, and tin reactants are included their salts of inorganic acids as, for example, the lead, mercury and tin halides, including the chlorides, bromides, and iodides, and lead, mercury, and tin sulfide. Other salts of inorganic acids are those which can be termed as salts of complex inorganic acids containing a chalkogen, namely oxygen or sulfur. By the term complex inorganic acid is intended those inorganic acids which contain at least one of the elements oxygen or sulfur in the anion and additionally contain therein another and different element of the groups III through VI of the periodic chart of the elements capable of forming complex ions with oxygen or sulfur. The non-metallic elements capable of forming complex ions with oxygen or sulfur of the groups III–A, IV–A, V–A, and VI–A are particularly preferred. Such include boron, carbon, nitrogen, silicon, phosphorous, arsenic, selenium, and tellurium. Included among the preferred anions of the complex inorganic acids are those wherein both oxygen and sulfur comprise the anion, e.g. the sulfate anion. Thus, typical examples of such salts include the lead, mercury, and tin sulfates, sulfonates, sulfinates, carbonates, nitrates, phosphates (both ortho and meta), pyrophosphates, persulfates, silicates, cyanates, thiocyanates, dithionates, borates (both ortho and meta), selenates, the various arsenates, and the like. Other mercury, lead, and tin salts which can be employed but are less preferable include, for example, those in which the anion comprises, in addition to the oxygen or sulfur, certain metals such as those of groups III–B through VI–B and III–A through V–A, for example, lead antimonate, tungstate, chromate, zirconate, molybdate, and the like.

Typical examples of the oxides employable in the process include lead suboxide, lead monoxide, red lead, lead dioxide, and the ores themselves, e.g. litharge and massicotite and analogous oxides of tin and mercury.

The salts of the organic acids can be further defined as such wherein the lead, mercury, or tin is attached to at least one carbon-containing organic radical through an intermediate atom of oxygen or sulfur. For practical reasons, the hydrocarbon portions of such acids will generally contain not more than about 25 carbon atoms, even though higher molecular weight materials can be employed. Illustrative examples of the lead, mercury and tin salts of organic acids include lead formate, lead diacetate, lead tetraacetate, lead propanoate, lead butanoate, lead octanoate, lead myristate, lead octadecanoate, lead linoleoate, lead butyrate, lead ethylate, lead phenolate, lead benzoate, lead thiophenolate, lead naphthenate, lead thioacetate, lead isobutyrate, lead propionate, and the like and corresponding compounds of tin and mercury. It is to be understood that the hydrocarbon portions of such organic acid salts can be further substituted to result in branched chain isomers or substituted with functional groups such as the halogens, keto, and the like groups, provided such are essentially inert in the reaction. The lead, mercury, and tin salts, particularly the lead salts, of the lower alkanoic acids, especially those having up to about 8 carbon atoms in the hydrocarbon portions, are preferred salts of organic acids because of their greater availability, economy, solubility in the reaction system, and higher yields obtained.

The above grouping of the tin, mercury, and lead reactants is not intended to indicate that the various classes or members of the classes are equivalent-type materials since some exhibit particular and unique advantage over others. For example, in certain instances, the lead, mercury, and tin reactants preferred are those which are completely miscible in the reaction system. Likewise, of the lead halides, lead chloride comprises a preferred embodiment. Of the lead salts of complex inorganic acids, lead sulfate comprises a preferred embodiment and of the lead salts of organic acids, those of the lower alkanoic acids having up to about 8 carbon atoms in the hydrocarbon portion, especially lead diacetate, are perferred. Lead chloride is preferred over the lead salts of organic acids and the salts of complex inorganic acids since higher yields are obtained. On the other hand, the lead oxides, particularly lead monoxide, is an especially preferred embodiment even though it is not completely miscible in the reaction system because of its greater availability, ready reactivity, and the high yields which are obtained. Likewise, the aforementioned lead compounds are preferred over the corresponding and other tin and mercury compounds because of their greater utility in the process and the more advantageous use to which the products obtained are applicable.

As mentioned previously, the bimetallic organometallic compound employed in the process is one in which one metal is boron and the other metal is selected from the group consisting of group I–A and II–A metals of the periodic chart of the elements. This reactant must, in general, have at least one carbon-to-metal bond and the unsatisfied valences can be satisfied with organic radicals, or other ligands which are essentially inert in the reaction. Such materials may be depicted by the following formula:

$$M(BY_aY'_b)_c$$

wherein M is a group I–A or II–A metal; B is boron; Y is an organic radical, preferably hydrocarbon having up to and including about 18 carbon atoms; Y' is a ligand including electron donating ligands as, for example, the halogens, organic radicals which are the same or different from Y and preferably hydrocarbon having up to and including about 18 carbons, and the like; "$a$" is a small whole number from 1 to 4 inclusive, "$b$" can be 0 to 3 inclusive, "$c$" is equivalent to the valence of M, and the sum of "$a$" and "$b$" is equal to 4. Typical examples of such compounds include sodium tetramethylboron, sodium tetraethylboron, sodium tetraoctylboron, sodium tetraoctadecylboron, sodium tetravinylboron, sodium tetracyclohexylboron, sodium tetra-1-hexenylboron, sodium tetraphenylboron, sodium tetrabenzylboron, sodium tetranaphthylboron, sodium methyltriethylboron, sodium ethylboron triethoxide, sodium diethylborondiethoxide, sodium triethylboron chloride, calcium bis(tetraethylboron), and similar such compounds wherein lithium, potassium, rubidium, cesium, beryllium, magnesium, calcium, strontium, or barium are substituted for sodium and other organic radicals and ligands are substituted for those mentioned above. The fully alkylated bimetallic boron compounds in which the organic radicals are hydrocarbon alkyl radicals having up to about 8 carbon atoms are especially preferred, particularly those wherein M is sodium, because of their greater availability, higher reactivity, better results obtained, and superior physical characteristics which contribute toward ease of handling, greater yields, and liquid phase reaction systems.

The proportions of the reactants can be varied over a considerable range to still result in the desired organolead, tin, and mercury compounds. It is preferable, however, to employ at least the stoichiometric amount of the bimetallic organometallic compound. Advantage is achieved in high yields and faster reaction rates when a molar excess between about 5 to 15 percent of the bimetallic organometallic reactant is employed. In determining the stoichiometry, one can base it upon the consumption of one or all of the organo groups attached to the metals via carbon of the bimetallic organometallic reactant. In the preferred embodiment wherein the organometallic reactant comprises only the group I-A or II-A metal, boron, and hydrocarbon radicals, faster reaction is obtained of the first hydrocarbon radical in the molecule. Therefore, a particular embodiment of the invention comprises employing the above stoichiometric proportions based upon reaction of only one hydrocarbon group per molecule of the bimetallic organometallic reactant. The by-product co-produced, particularly in these instances, is an organoborane which is readily recovered and employed in forming the starting bimetallic organometallic reactant. For example, when reacting sodium tetraethylboron with lead oxide in stoichiometric proportions to consume only one of the ethyl groups, a very rapid reaction is obtained and triethylborane is co-produced which can be recovered by conventional techniques and reacted in a separate system, for example, with sodium hydride and ethylene, particularly in the presence of ethers, to produce the sodium tetraethylboron which is recycled to the process. The following equations will typify the reactions of the present invention illustrating especially preferred embodiments and will assist in determining the stoichiometric ratios:

$4NaBEt_4 + 2PbO + 2H_2O \rightarrow Et_4Pb + Pb + 4NaOH + 4BEt_3$
$NaBEt_4 + 2PbO + 2H_2O \rightarrow Et_4Pb + Pb + NaOH + B(OH)_3$

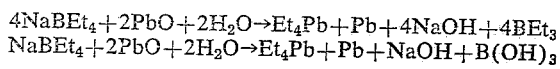

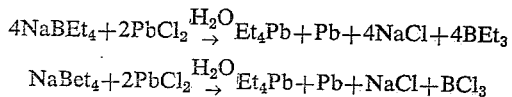

Thus, with lead oxide, one will preferably use at least one mole of the organometallic reactant, e.g. sodium tetraethylboron, for every two moles of lead oxide but preferably at least 4 moles of the organometallic reactant for every 2 moles of the lead oxide. These above criteria apply for all of the divalent lead, tin, and mercury reactants employed. When tetravalent lead and tin reactants are employed, the stoichiometry will, of course, change and by-product lead or tin metal is not obtained. Nor is by-product mercury obtained when a mercury reactant is employed.

The water employed in the system, as indicated previously, is usually provided in amount to result in a fluid reaction mixture. In view of the above stoichiometry, it is usually desirable to employ at least 2 moles of water per mole of the bimetallic organometallic reactant. In a preferred embodiment, between about 10 to 100 moles of water per mole of the bimetallic organometallic reactant is employed.

The process is subject to relatively simple manipulative operations. In general, the requisite amounts of bimetallic organometallic reactant and water are added to a reactor and then the lead, tin, or mercury compound is added thereto. The reverse mode of addition is equally applicable although higher yields are obtained when adding the lead, tin, or mercury compound to the organometallic reactant. The mixture is then agitated to facilitate contact of the reactants. During the addition and reaction, an inert atmosphere is preferably employed when certain by-product boron compounds are obtained, e.g. triethylborane, because of their flammability. The mixture is reacted at the desired temperature and then, or during the course of the reaction, the product can and preferably is withdrawn from the reactor in essentially pure form by gravity separation. In some cases the product phase will be in admixture with the by-product organoborane. These can be separated from each other by distillation or crystallization. Alternatively, the product is readily distillable from the reaction mixture in pure form. The by-product organoborane, when obtained, is also recoverable by distillation and/or crystallization. It is to be understood that other variations in the process can be made without departing from the purposes of the present invention.

The process will be more completely understood from a consideration of the following examples wherein all parts are by weight unless otherwise specified.

*Example I*

A reactor equipped with internal agitation, external heating means, a means for maintaining an inert atmosphere, a means for collecting and condensing boiling constituents, along with a means for adding and discharging reactants and products, was employed. To this reactor was added 16.68 parts of lead chloride and 100 parts of water. An inert atmosphere of nitrogen was then maintained. Agitation was commenced and the mixture heated to approximately 100° C. Then a solution of 18.75 parts of sodium tetraethylboron in 150 parts of water was slowly added to the reactor at a rate to maintain distillation of by-product triethylborane which was condensed and cooled. The total addition period was 30 minutes. At the end of the addition period, the reaction mixture was maintained at 100° C. for 15 minutes. To the residue remaining in the reactor was added 100 parts of hexane to extract the tetraethyllead. Then the hexane and water layers were separated and allowed to stand for one hour. At the end of this period, the organic layer was recovered and analyzed for tetraethyllead content. It was found that 6.24 parts of tetraethyllead were recovered in this manner representing a yield of 64 percent, and 6.08 parts of lead metal were recovered from the reactor which represent an essentially quantitative formation of lead metal. It is evident that an essentially quantitative formation of tetraethyllead was obtained and that a more effective recovery technique, such as gravity separation, would effect a quantitative recovery. Analysis of the condensed phase obtained during the reaction showed a 96 percent recovery of triethylborane.

*Example II*

Employing the reactor of Example I, 8.0 parts of lead monoxide and 250 parts of water were added to the reactor and the mixture heated to 70° C. and 220 mm. of mercury pressure in the system while maintaining a nitrogen atmosphere. Then, 10.5 parts of sodium tetraethylboron in 100 parts of water were added to the mixture with agitation at a rate to maintain distillation of by-product triethylborane, about 30 minutes total addition period. At the end of this period, the reaction mixture was permitted to cool to room temperature and the system brought to atmospheric pressure. The organic layer in the distillation receiver was withdrawn and then extracted with 130 parts of 2,2,5-trimethylhexane. The extract was redistilled at 215 mm. mercury pressure while raising the temperature to 55° C. At 55 to 65° C., 3.2 parts of pure triethylborane was obtained representing a 48 percent recovery. The residue in the reactor was extracted with hexane and the extract phase withdrawn. Upon analysis of the extract phase, an 83 percent yield of tetraethyllead was found.

It is not necessary that the above examples be accomplished at a reduced pressure as indicated. The reaction can be conducted at atmospheric pressure and without the hexane extraction so that at the completion of the reaction, the reaction mixture can be subjected to distillation to remove the by-product tri-ethylborane, then the residue in the reactor can be filtered and the tetraethyllead phase separated from the water phase by gravity in high yield and purity. Likewise, the reverse mode of addition of the reactants is preferably employed since higher yields are obtained in shorter periods.

*Example III*

The procedure of Example II was repeated with exception that 9.6 parts of lead acetate were reacted with 10.5 parts of sodium tetraethylboron in 350 parts of water at 70° C., employing a rate of addition that would maintain distillation of the by-product, triethylborane, at 220 mm. mercury pressure. In this manner, tetraethyllead was produced in 75 percent yield and 50 percent of the triethylborane was readily recovered.

Example IV

To a reactor similar to that of Example I, but without the distillation equipment, was added 1.6 parts of mercuric acetate dissolved in 50 parts water and 25 parts of 0.5 N sodium hydroxide solution. Agitation was commenced; then 6.8 parts of sodium tetraphenylboron, dissolved in 50 parts water, was added over a period of 26 minutes. After stirring without heating for one hour, the mixture was then heated over a 1 hour period to 57° C. and then allowed to cool to room temperature. The reaction mixture was then filtered and the filtrate saved for subjecting to separation techniques to recover triphenylborane. The solids were washed with alkaline solution and then subjected to analysis. The solid product remaining comprised diphenylmercury in a high yield.

Example V

To the reactor of Example I, modified by employing a reflux condenser in place of the distillation equipment, was added 14.8 parts of mercuric sulfate and 100 parts of 2.5 N sodium hydroxide solution. Then 18 parts of sodium tetraethylboron dissolved in 150 parts water was slowly added to the stirred mixture in the reactor, maintaining the temperature at 75° C. The addition of the sodium tetraethylboron was completed within 10 minutes resulting in a clear, colorless reaction mixture. Agitation was continued for an additional 5 minutes, then the mixture was cooled to room temperature and agitation stopped. The lower water insoluble phase was withdrawn, then distilled at 15 mm. pressure. In this manner 10 parts of liquid were collected boiling between 52 to 54° C. at this pressure representing an 80 percent yield of diethylmercury.

Example VI

The procedure of Example V was repeated with exception that 16.5 parts of sodium tetraethylboron dissolved in 100 parts of water were slowly added to 11.3 parts of stannous chloride dissolved in water at 50° C. with agitation. A red oil formed and agitation was continued for 5 minutes after completion of addition of the sodium tetraethylboron. The total reaction time was 20 minutes. Diethyltin, partially polymerized, was obtained in high yield.

Example VII

When 8.6 parts of lead naphthenate are reacted with 4.2 parts of sodium tetra-1-hexenylboron in 65 parts of water, and in the presence of 0.7 part of calcium hydroxide at 20° C. for 4 hours, tetra-1-hexenyllead is obtained along with tri-1-hexenylborane.

Example VIII

Tetraoctyllead is obtained in high yield and purity along with trioctylborane when 19.6 parts of lead phenolate are reacted with 53.5 parts of sodium tetraoctylborane in the presence of 250 parts of water and 2.5 parts of lithium hydroxide at 75° C. for 3 hours.

Example IX

When 2 moles of lead sulfate are reacted with 4.5 moles of sodium tetraphenylboron in the presence of 555 moles of water and 2 moles of sodium hydroxide at 90° C. for 2 hours, tetraphenyllead is produced.

Example X

Employing the procedure of Example II with exception that an equivalent amount of sodium tetracyclohexylboron is substituted for sodium tetraethylboron and the reaction temperature is maintained at 45° C. and atmospheric pressure for 3 hours, tetracyclohexyllead and tricyclohexylborane are obtained in high yield.

Example XI

When 20.2 parts of sodium diethylboron diethoxide are reacted with 11.1 parts of lead oxide in the presence of 100 parts of water at 60° C. for 3 hours, tetraethyllead is obtained and ethylboron diethoxide is also recovered in high yield.

Example XII

When lead sulfide is reacted with calcium bis-(tetraethylboron) according to the procedure of Example V, tetraethyllead and triethylboron are obtained in high yield.

The process is also applicable to the formation of mixed organolead, tin and mercury compounds. The following example will illustrate this embodiment.

Example XIII

When 1 mole of sodium ethyltrimethylboron is reacted with 2 moles of lead oxide in the presence of 60 moles of water under reflux conditions for 4 hours, mixed ethylmethyllead compounds are produced.

The above examples are presented by way of illustration and the invention is not intended to be limited thereto. It will be evident that other reactants described hereinbefore can be substituted to produce the corresponding organotin, lead and mercury products. For example, in Example I, one can substitute lead, mercury, or tin bromide or iodide or diethyllead dichloride; in Examples III and IV, one can substitute lead, tin, or mercury benzoate, octanoate, 1-octenoate, ethylate, thiophenolate, propiolate and the like and lead tetraacetate; and in Example V, one can substitute lead and tin nitrates, cyanates, thiocyanates, chlorates, and the like.

As indicated, advantage is achieved by incorporating a base in the reaction mixture. The incorporation of such materials in the reaction mixture consistently results in enhancing the yields obtained and more effective separation of the product. This effect is especially apparent when the lead, tin, or mercury reactant is a component other than an oxide and, in these instances, the presence of the hydroxide is therefore generally preferred. For this purpose, the alkali and alkaline earth hydroxides are quite well suited as, for example, sodium hydroxide, potassium hydroxide, lithium hydroxide, magnesium hydroxide, calcium hydroxide, strontium hydroxide, and the like. The hydroxide need be added only in minor amount to result in a slight basicity of the reaction mixture. Generally, such materials are preferably added in amount between about 0.1 to 3 moles hydroxide ion per mole of the lead, mercury, or tin reactant.

The temperature at which the reaction is conducted is subject to considerable latitude, but ordinarily is between about 0° C. to the decomposition temperature of the reactants or products. For practical reasons, the reaction is usually conducted at between about 0 to 100° C. Best results are obtained, however, when the temperature is maintained between 20 to 100° C. There is no need to employ pressure in the operation unless one desires to conduct the reaction at a temperature above the boiling point of the reaction mixture. Reduced pressures can be employed if it is desired to steam distill the product as, for example, when it is lower boiling than the bimetallic organometallic reactant, or when it is desired to withdraw the by-product organoborane during reaction.

While some of the lead, tin, and mercury reactants are insoluble in the reaction mixture, they are still employable, although less preferred with exception of the oxides as discussed previously. When employing such insoluble reactants, it is preferable that they be in a finely divided form as, for example, below about 1/16" in major dimension. Such facilitates easier handling and more intimate contact of the reactants. Such forms of this reactant are readily obtainable commercially or obtained by mechanical sub-division, such as grinding and the like, if necessary.

In order to minimize flammability of the reaction system, the reaction is generally conducted in an inert atmosphere. For this purpose, the usual inert gases are quite applicable as, for example, neon, nitrogen, argon, krypton, and the like.

The length of time of conducting the reaction is subject to considerable latitude, in some instances being essentially complete merely upon mixing the reactants, and in other instances taking place usually within about 10 hours for practical purposes. In a preferred embodiment, the reaction is conducted over a period between about ½ hour to 5 hours. It will be evident that the process is readily adaptable to continuous operation merely by providing a stream of the mercury, tin, or lead reactant to comingle with a stream of the bimetallic organometallic reactant, water, and metal hydroxide, if employed, with continuous withdrawal of the product organotin, -lead, or -mercury from the reaction system.

The products produced according to the process are of considerable and well-known utility. For example, the organolead compounds, especially tetraethyllead, are useful as additives to motor fuels in order to enhance their antiknock quality. The organotin compounds are useful as biocides, preservatives, in forming fiber coatings, as plasticizers, and the like. The alkyl mercury compounds are useful as intermediates for forming other organometallic compounds, a typical reaction being that of diethylmercury with sodium to form ethylsodium. Another use for the mercury compounds, and derivatives thereof, is in agricultural chemical applications. These and other uses of the products produced will be evident.

Having thus described the process of this invention, it is not intended that it be limited except as set forth in the following claims.

I claim:

1. The process for the manufacture of an organometallic compound of a metal selected from the group consisting of lead, tin, and mercury which comprises reacting a compound selected from the group consisting of lead, tin, and mercury salts and oxides which are essentially inert to water with a bimetallic hydrocarbon metal compound wherein one metal is boron and the other metal is selected from the group consisting of alkali and alkaline earth metals in the presence of water.

2. Process of claim 1 wherein the reaction is conducted in the further presence of a hydroxide selected from the group consisting of alkali and alkaline earth metal hydroxide.

3. The process of claim 1 wherein said lead compound is lead oxide and said bimetallic hydrocarbon metal compound is a sodium tetraalkylboron compound.

4. The process of claim 3 wherein the reaction is conducted at a temperature between about 20 to 100° C.

5. The process of claim 1 wherein said tin compound is tin oxide, said bimetallic hydrocarbon metal compound is a sodium tetraalkylboron compound, and the reaction is conducted at a temperature between about 20 to 100° C.

6. The process of claim 1 wherein said mercury compound is an oxide of mercury, said bimetallic hydrocarbon metal compound is a sodium tetraalkylboron compound, and the reaction is conducted at a temperature between about 20 to 100° C.

7. The process of claim 1 wherein said lead compound is a lead halide, said bimetallic hydrocarbon metal compound is a sodium tetraalkylboron compound, and the reaction is conducted at a temperature between about 20 to 100° C.

8. The process of claim 7 wherein said lead halide is lead chloride and said sodium tetraalkylboron compound is sodium tetraethylboron.

9. A process for the manufacture of tetraethyllead which comprises reacting lead oxide with sodium tetraethylboron at a temperature between about 20 to 100° C. in the presence of water.

10. The process for the manufacture of tetraethyllead which comprises adding a solution of sodium tetraethylboron in water to a solution of lead chloride in water, previously heated to a temperature of about 100° C., at a rate sufficient to maintain distillation of by-product triethylborane from the reaction mixture and recovering said by-product triethylborane and tetraethyllead.

11. The process for the manufacture of tetraethyllead which comprises adding a solution of sodium tetraethylboron in water to a mixture of lead oxide in water while maintaining a temperature and rate of addition sufficient to simultaneously distill byproduct triethylborane from the reaction mixture and recovering said triethylborane and tetraethyllead.

References Cited in the file of this patent

Chemical Reviews, vol. 54, October 1954, pp. 875 to 890.

UNITED STATES PATENT OFFICE
CERTIFICATION OF CORRECTION

Patent No. 2,950,302                              August 23, 1960

James M. Riddle

It is hereby certified that error appears in the above numbered patent requiring correction and that the said Letters Patent should read as corrected below.

In the grant lines 1, 2 and 3, for "James M. Riddle, of Baton Rouge, Louisiana," read -- James M. Riddle, of Baton Rouge, Louisiana, assignor to Ethyl Corporation, of New York, N. Y., a Corporation of Delaware, --; line 12, for "James M. Riddle, his heirs" read -- Ethyl Corporation, its successors --; in the heading to the printed specification, line 4, for "James M. Riddle, Baton Rouge, La." read -- James M. Riddle, Baton Rouge, La., assignor to Ethyl Corporation, New York, N. Y., a corporation of Delaware --.

Signed and sealed this 18th day of April 1961.

(SEAL)
Attest:

ERNEST W. SWIDER
Attesting Officer

DAVID L. LADD
Commissioner of Patents